(12) United States Patent
Busse et al.

(10) Patent No.: US 8,899,271 B2
(45) Date of Patent: Dec. 2, 2014

(54) PRESSURE ACCUMULATOR

(71) Applicant: Schaeffler Technologies AG & Co. KG, Herzogenaurach (DE)

(72) Inventors: Michael Busse, Herzogenaurach (DE); Ali Bayrakdar, Roethenbach/Pegnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/926,358

(22) Filed: Jun. 25, 2013

(65) Prior Publication Data

US 2013/0340871 A1 Dec. 26, 2013

(30) Foreign Application Priority Data

Jun. 26, 2012 (DE) .......................... 10 2012 210 795

(51) Int. Cl.
*F16L 55/04* (2006.01)
*F15B 1/24* (2006.01)
*F01L 1/344* (2006.01)

(52) U.S. Cl.
CPC ......... *F15B 1/24* (2013.01); *F01L 2001/34446* (2013.01); *F15B 2201/605* (2013.01); *F15B 2201/21* (2013.01); *F15B 2201/31* (2013.01); *F15B 2201/61* (2013.01); *F15B 2201/4056* (2013.01); *Y02E 60/15* (2013.01)
USPC .............................. 138/31; 138/30; 123/90.34

(58) Field of Classification Search
USPC .............. 138/30, 31; 123/90.34, 90.12, 188.4
See application file for complete search history.

(56) References Cited

U.S. PATENT DOCUMENTS

| | | | |
|---|---|---|---|
| 2009/0293978 A1* | 12/2009 | Lauterbach ..................... | 138/31 |
| 2011/0197835 A1* | 8/2011 | Boegershausen .......... | 123/90.15 |
| 2012/0227691 A1* | 9/2012 | Boegershausen et al. . | 123/90.12 |
| 2012/0240888 A1* | 9/2012 | Boegershausen et al. . | 123/90.34 |
| 2012/0304953 A1* | 12/2012 | Boegershausen .......... | 123/188.4 |

FOREIGN PATENT DOCUMENTS

DE 102009054055 5/2011

* cited by examiner

*Primary Examiner* — Patrick F Brinson
(74) *Attorney, Agent, or Firm* — Davidson, Davidson & Kappel, LLC

(57) ABSTRACT

A pressure accumulator includes a housing having a housing cavity, a piston axially displaceable in the housing cavity between a first final position and a second final position and having a pressure surface which together with a wall of the housing cavity delimits at least partially a reservoir connectable to an ICE consumer in a fluid-conveying manner, an energy store cooperating with the piston, the piston being displaceable against the force of the energy store from the first final position into the second final position in that the reservoir is acted on by pressure using a pressure medium, and a locking device for locking the piston in the second final position. A locking tube is connected to the piston and supported within the housing in an axially shiftable manner, and lockable at an end of the housing facing away from the reservoir with the aid of a locking pin.

12 Claims, 1 Drawing Sheet

PRESSURE ACCUMULATOR

This claims the benefit of German Patent Application DE 10 2012 210 795.9, filed Jun. 26, 2012 and hereby incorporated by reference herein.

The present invention relates to a pressure accumulator for supporting the pressure supply of at least one consumer of an internal combustion engine including a housing having a housing cavity, a piston which is axially displaceable in the housing cavity between a first final position and a second final position and which is provided with a pressure surface which together with a wall of the housing cavity delimits at least partially a reservoir connectable to the consumer in a fluid-conveying manner, an energy store, in particular a spring element, which cooperates with the piston, the piston being displaceable against the force of the energy store from the first final position into the second final position by the reservoir being acted on by pressure using a pressure medium. Moreover, the pressure accumulator includes a locking device for locking the piston in the second final position.

BACKGROUND

A pressure accumulator is usually used to compensate for operational pressure fluctuations in a conveying system of a pressure medium, usually engine oil, by storing a certain volume of pressure medium at a predetermined pressure.

Such a pressure accumulator is, for example, filled with the pressure medium via a pressure medium pump during operation of an internal combustion engine of a motor vehicle. If the system pressure supplied by the pressure medium pump drops below a value which is necessary for a fail-safe operation, the pressure medium stored in the pressure accumulator may be emptied into the pressure medium line and is thus immediately available. This makes it possible to compensate for the event of the system pressure dropping below a minimum pressure within the pressure medium system or to increase the volume flow.

For example, such a pressure accumulator may be used to support the pressure supply of a camshaft adjuster. The camshaft adjuster is in this case used in an internal combustion engine of a motor vehicle to be able to variably set the phase relation between a crankshaft and a camshaft in a defined angle range. The camshaft adjuster regularly has an output element which is situated rotatably in relation to a drive element. The drive element is usually in drive connection to the crankshaft; the output element is rotatably fixedly connected to the camshaft. The output element and the drive element essentially delimit at least two pressure chambers acting against one another. By connecting the pressure chambers in a targeted manner to a pressure medium pump or to a pressure medium tank, the phase position of the output element may be set or maintained in relation to the drive element and thus of the camshaft in relation to the crankshaft.

Here, the pressure accumulator may be situated in the camshaft cavity of a hollow camshaft, in particular, and may be communicatively connected to the camshaft adjuster, and, for example, prevent a sudden drop in the adjustment speed during an adjustment procedure. At the beginning of a phase adjustment, a certain quantity of the pressure medium is withdrawn from the pressure medium system of the internal combustion engine. Consequently, the system pressure drops to a lower level. The system pressure present prior to the adjustment is therefore not available to the full extent. This results in the adjustment speed of the camshaft adjuster dropping. This pressure drop is compensated for by the full pressure accumulator, whereby the adjustment speed may be maintained at a high level.

A pressure accumulator of the type mentioned at the outset is known, for example, from DE 10 2009 054 055 A1. Here, the device for supplying pressure designed as a pressure accumulator essentially includes a housing having a housing cavity in which a displaceable element is situated which is designed as a piston and which is displaceable between a first final position and a second final position. The displaceable element is provided with a pressure surface which, together with a housing cavity wall, delimits at least partially a reservoir connectable to the consumer of an internal combustion engine in a fluid-conveying manner. Here, the displaceable element may be displaced from the first final position into the second final position by applying pressure against the force of an energy store. Furthermore, the pressure accumulator has a locking mechanism which is designed as a locking device and using which the displaceable element may be locked in the second final position. The disadvantage here is, however, in particular the implementation of the locking device, whose manufacture and assembly are complex, and the placement of the locking device in the housing in the area of the reservoir directly behind the pressure surface of the displaceable element, which also has an unfavorable effect on the assembly.

SUMMARY OF THE INVENTION

It is an object of the present invention to provide a pressure accumulator which may be manufactured and assembled simply and cost-effectively.

The present invention provides a pressure accumulator for supporting the pressure supply of at least one consumer of an internal combustion engine including a housing having a housing cavity, a piston which is axially displaceable in the housing cavity between a first final position and a second final position and which is provided with a pressure surface which together with a wall of the housing cavity delimits at least partially a reservoir connectable to the consumer in a fluid-conveying manner, an energy store, in particular a spring element, which cooperates with the piston, the piston being displaceable against the force of the energy store from the first final position into the second final position by the reservoir being acted on by pressure using a pressure medium. Moreover, the pressure accumulator includes a locking device for locking the piston in the second final position. In this case, the locking device includes a locking tube which is connected to the piston and which is supported within the housing in an axially shiftable manner, the locking tube being lockable at an end of the housing facing away from the reservoir with the aid of a locking pin.

The present invention is directed here to the idea of designing and situating components and assemblies in mass production in such a way that they may be manufactured relatively cost-effectively and assembled easily and precisely. This is even more true for an automated manufacture in which it is often easier and more cost-effective to manufacture and mount components which have simple geometric shapes. Furthermore, the present invention is directed to the idea that the assembly process is made considerably easier if a component to be mounted is accessible from the outside.

Therefore, the present invention provides the implementation of the locking device with the aid of components, which are easy to manufacture and which have a simple geometry, i.e., a locking tube and a locking pin. They may also be mounted easily within the housing. By implementing the locking mechanism on an end of the housing facing away from the reservoir, the locking device does not have to be mounted axially far within the housing, but is accessible at least partially from the outside, which also has a positive effect on the assembly process.

The pressure accumulator is in this case used for supporting the pressure supply of a camshaft adjuster, for example. Here, the pressure accumulator may, in particular, be used in a camshaft cavity of a camshaft.

The piston is, for example, designed as a deep-drawn part and is, in particular, composed of a piston crown and a piston skirt formed in one piece. Here, the piston crown, in particular, forms together with the wall of the housing cavity the reservoir which is connectable to the consumer in a fluid-conveying manner. The locking tube may, for example, be connected to the piston via a screw connection or a welded connection.

In the second final position of the piston, the locking tube cooperates with the locking pin in such a way that the locking tube and thus also the piston connected thereto is axially fixed via the locking pin. Here, the locking mechanism is implemented on the end of the housing facing away from the reservoir.

The embodiment according to the present invention has the advantage that the pressure accumulator may thus be manufactured and mounted easily and cost-effectively. The locking device, which may be implemented technically in a particularly simple manner, includes few, easily manufacturable components which in addition may be easily mounted, in particular by implementing the locking mechanism at an axial end of the housing.

The locking tube is advantageously axially displaceably supported within a guiding tube situated coaxially in the housing cavity, the locking tube having a radial bore in which a ball is radially movably accommodated. Here, the locking pin is situated at the end of the housing facing away from the reservoir in such a way that it is axially displaceable against the restoring force of a restoring element, and the ball is at least partially accommodated by a receiver in the second final position in such a way that the locking pin cooperates with the ball to lock the piston. Here, the fact is used, in particular, that the pressure accumulator is situated in most cases within a rotating component and in particular within a rotating camshaft and that in this case centrifugal forces act on the individual components which may be used for technical implementation of the locking device. If the piston moves together with the locking tube by the reservoir being acted on by a pressure medium in the direction of the second final position in which the piston is locked, then the ball initially pushes the locking pin axially outward against the restoring force of the restoring element. As soon as the locking tube axially reaches the position in which the ball is situated opposite the receiver, the ball moves radially outward into the receiver due to the centrifugal force acting on it. This makes it possible for the restoring element to push the locking pin back in the direction of the piston, so that the ball is "sandwiched" between the guiding tube and the locking pin. In this way, the locking tube and thus the piston connected thereto are axially easily fixed. Consequently, the piston remains in this position even if the pressure is reduced and the pressure medium may remain in the reservoir. If the piston is not located in the second final position, the ball is prevented by the inner jacket surface of the guiding tube from unintentionally "falling out" radially outward.

In one advantageous specific embodiment, the locking tube has a plurality of radial bores distributed in the peripheral direction, in each radial bore a ball being radially movably accommodated in each case. Here, the radial bores each have a greater diameter than the balls, so that the balls are radially freely movable in the bores. In particular, the locking tube has three radial bores which are spaced apart from one another in the peripheral direction and thus a total of three balls accommodated in the radial bores.

Advantageously, a supporting element having a through borehole is introduced within the housing at the axial end facing away from the reservoir, the energy store being supported at the front side of the supporting element facing the reservoir. The supporting element is accommodated in the housing with the aid of a press fit for this purpose. If a guiding tube is situated within the housing, the guiding tube is at least partially accommodated in the through borehole of the supporting element. The guiding tube may in this case be supported in the supporting element with the aid of a clearance fit or a press fit. The front side of the supporting element facing the reservoir is used at the same time as the piston stop and thus for axially delimiting the path of the piston. Thereby, it may in particular be prevented that an energy store, which is in particular designed as a spring element, is compressed to a block.

At least one axial bore is advantageously introduced into the wall of the supporting element, in particular for pressure compensation and/or for the discharge of a pressure medium leakage. Here, the axial bore extends along the entire length of the supporting element. In particular, the space which is formed between the piston crown and the front side of the supporting element facing the reservoir and which accommodates the energy store may be "vented" via the axial bore. Furthermore, a pressure medium leakage, which flows, in particular, along between the piston skirt and the inner jacket surface of the housing, may be discharged and fed back into the pressure medium circuit, for example.

The receiver is advantageously situated on the inner jacket surface of the guiding tube. In this receiver, the ball is at least partially accommodated in the second final position in such a way that the locking pin cooperates with the ball to lock the piston, i.e., the ball is "sandwiched" between the locking pin and the guiding tube. The receiver may in particular be designed as a recess, e.g., as an indentation or a groove, on the inner jacket surface of the guiding tube. If a plurality of balls is present, the corresponding number of receivers is also present or the receiver is designed in such a way that all balls may be accommodated therein.

In this embodiment, the guiding tube is supported in the supporting element with the aid of a clearance fit. To axially delimit the path of the guiding tube, the guiding tube advantageously has a groove having a retaining ring situated therein, the retaining ring resting axially against the supporting element. On the outer jacket surface of the guiding tube, an at least partially circumferential groove is introduced in which a retaining ring, in particular a snap ring, is situated. The retaining ring may in this case strike the front side of the supporting element facing the reservoir, whereby the guiding tube is axially secured.

In one alternative specific embodiment, the guiding tube has advantageously axially struck the supporting element, the receiver being situated at the inner jacket surface of the supporting element. Here, the guiding tube is supported tightly in the supporting element with the aid of a press fit, e.g., at a ledge of the supporting element. The receiver may in particular be designed as a recess, e.g., as an indentation or a groove, on the inner jacket surface of the supporting element. Here, the recess may, in particular, form a receiver for the ball together with the front side of the guiding tube facing the locking pin. If a plurality of balls is present, the corresponding number of receivers is also present or the receiver is designed in such a way that all balls may be accommodated therein. In this way, the receiver does not have to be introduced into the guiding tube which is relatively thin-walled compared to the supporting element and may thus be manufactured more simply and cost-effectively.

The receiver is advantageously designed as a circumferential ring groove. Here, the ring groove may be introduced into the inner jacket surface of the guiding tube or into the inner jacket surface of the supporting element depending on the specific embodiment. If a plurality of balls is present, it is not necessary to provide multiple receivers distributed in the peripheral direction, but one single ring groove is sufficient which is easy to manufacture and which is used as a receiver for all balls.

In one alternative specific embodiment, the locking pin is situated within an assembly sleeve, the guiding tube having axially struck the assembly sleeve and the inner diameter of the guiding tube being widened at the end facing the assembly sleeve in such a way that the widening forms the receiver for the ball. The assembly sleeve is supported in the supporting element with the aid of a press fit. The guiding tube is supported in the supporting element with the aid of a clearance fit and has axially struck the assembly sleeve. In this way, the guiding tube is axially secured, and in particular the locking pin and the restoring element may be preassembled in the assembly sleeve. By widening the guiding tube to form the receiver for one or more balls, it is furthermore not necessary to manufacture a recess as the receiver, for example.

Preferably, an essentially hollow-cylindrical sealing plug is connected to the housing in a force-fitted and/or integral manner at the axial end of the housing opposing the locking pin, in particular for providing an axial stop for the piston. Here, the stop may, in particular, be used as an axial end stop for the piston at the axial end opposing the locking pin. Alternatively, it is also possible, for example, that the housing wall is bent radially inward in the area of this axial end by beading.

If the locking tube is situated within the guiding tube, it must be able to move axially back and forth within the guiding tube, for which purpose the guiding tube in particular has one or more bores for pressure compensation. These one or more bores may also be used at the same time for discharging a pressure medium leakage.

BRIEF DESCRIPTION OF THE DRAWINGS

Specific embodiments of the present invention are elucidated in detail below with reference to the drawings.

DETAILED DESCRIPTION OF THE DRAWINGS

Figure 1:
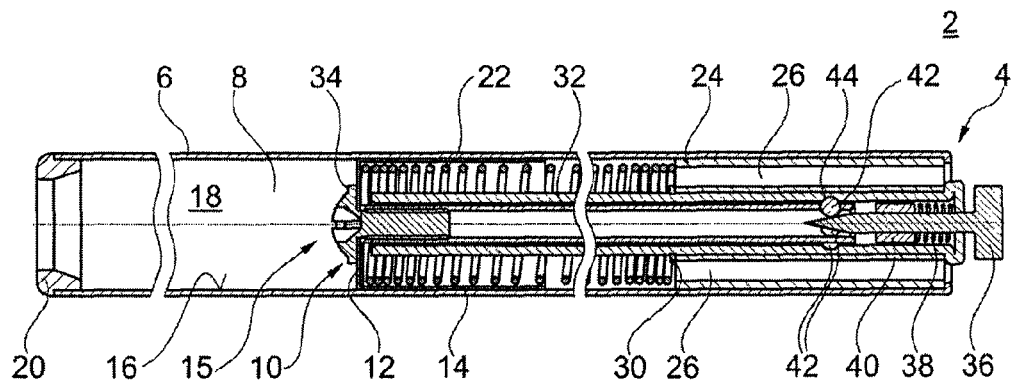
FIG. 1 shows a pressure accumulator having a locking device in a longitudinal section.

FIG. 1 shows a pressure accumulator 2 having a locking device 4 in a longitudinal section. Pressure accumulator 2 may be inserted into a camshaft cavity of a hollow camshaft and used for supporting the pressure supply of a camshaft adjuster, in particular.

Pressure accumulator 2 includes a hollow-cylindrical housing 6 which forms a housing cavity 8. In housing cavity 8, a piston 10 is accommodated which is axially displaceable between a first final position and a second final position. Piston 10 is designed as a deep-drawn part and is, in particular, composed of a piston crown 12 and a piston skirt 14 formed in one piece. Here, piston crown 12 designed as a pressure surface 15, in particular, forms together with wall 16 of housing cavity 8 reservoir 18 which is connectable to the camshaft adjuster in a fluid-conveying manner.

At the left-hand axial end of housing 6, an essentially hollow-cylindrical sealing plug 20 is integrally connected to housing 6, in particular for providing an axial stop for piston 10.

An energy store 22 which cooperates with piston 10 and which is designed as a helical pressure spring rests with one of its ends against piston 10. With its other end, energy store 22 rests against a front side of a supporting element 24 pressed into housing 6. The front side of supporting element 24 facing reservoir 18 is used at the same time as the piston stop and thus for axially delimiting the path of piston 10. Furthermore, this may, in particular, prevent energy store 22 from being compressed to a block.

Multiple axial bores 26 are introduced into the wall of supporting element 24 for pressure compensation and for the discharge of a pressure medium leakage. Here, the axial bores extend along the entire length of supporting element 24. In particular, the space which is formed between piston crown 12 and the front side of supporting element 24 facing reservoir 18 and which accommodates energy store 22 may be "vented" via axial bores 26. Furthermore, the pressure medium leakage, which flows, in particular, along between piston skirt 14 and the inner jacket surface of housing 6, may be discharged and fed back into a pressure medium circuit, for example.

In a through borehole of supporting element 24, a guiding tube 28 is at least partially accommodated. Guiding tube 28 is supported here in supporting element 24 with the aid of a clearance fit. To axially delimit the path of guiding tube 28, the latter advantageously has a groove having a retaining ring 30 situated therein, retaining ring 30 resting axially against supporting element 24. On the outer jacket surface of guiding tube 28, an at least partially circumferential groove is introduced in which retaining ring 30 is situated, which is in particular designed as a snap ring. Retaining ring 30 may in this case strike the front side of the supporting element facing the reservoir, whereby guiding tube 28 is axially secured.

Locking device 4 of the pressure accumulator includes a locking tube 32 which is connected to piston 10 and which is axially displaceably supported within guiding tube 28. Locking tube 32 is in this case connected via a screw 34 to piston 10. Furthermore, a locking pin 36 is axially displaceably situated at an end of housing 6 facing away from reservoir 18 against the restoring force of a restoring element 38 designed as a helical spring. Here, a bush 40, which is used as a stop for restoring element 38 and to guide locking pin 36 within guiding tube 28, is pressed onto locking pin 36.

Locking tube 32 has three radial bores distributed in the peripheral direction, in each radial bore a ball 42 being radially movably accommodated in each case. Here, the radial bores each have a greater diameter than balls 42, so that the balls are radially freely movable in the radial bores.

A receiver 44 for balls 42 designed as a ring groove is introduced into the inner jacket surface of guiding tube 28. In this receiver 44, balls 42 may be accommodated at least partially at a certain position of piston 10 in such a way that locking pin 36 cooperates with balls 42 to lock piston 10, i.e., balls 42 are "sandwiched" between locking pin 36 and guiding tube 28.

If piston 10 moves together with locking tube 32 in that reservoir 18 is acted on by pressure using a pressure medium in the direction of the second final position which is shown in FIG. 1 and in which piston 10 is locked, then balls 42 initially push locking pin 36 axially outward against the restoring force of restoring element 38. As soon as locking tube 32 axially reaches the position which is shown in FIG. 1 and in which balls 42 are situated opposite receiver 44, balls 42 move radially outward into receiver 44 due to the centrifugal forces acting on them. This makes it possible for restoring element 38 to push locking pin 36 back in the direction of piston 10, so that balls 42 are "sandwiched" between guiding tube 28 and locking pin 36. In this way, locking tube 32 and thus piston 10 connected thereto are axially easily fixed. Consequently, piston 10 remains in this position even if the pressure is reduced and the pressure medium may remain in reservoir 18.

To unlock piston 10, locking pin 36 may be operated by an electromagnetic actuator (not illustrated). This actuator draws locking pin 36 axially outward against the force of restoring element 38. In this way, locking tube 32 and thus also piston 10 are "released" the piston moving axially to the left against the force of energy store 22 and thus pushing the pressure medium present in reservoir 18 out of pressure accumulator 2 back into the pressure medium circuit. In the process, locking tube 32 draws balls 42 out of receiver 44. In this way, the camshaft adjuster may, in particular, also be supplied with pressure medium even if the engine-side pressure medium supply is not sufficient.

This locking device 4, which may be implemented technically in a particularly simple manner, includes overall few, easily manufacturable components which in addition may be easily mounted, in particular by implementing the locking mechanism at an axial end of housing 6. Pressure accumulator 2 may in this way be manufactured and mounted in a particularly simple and cost-effective manner.

Figure 2:
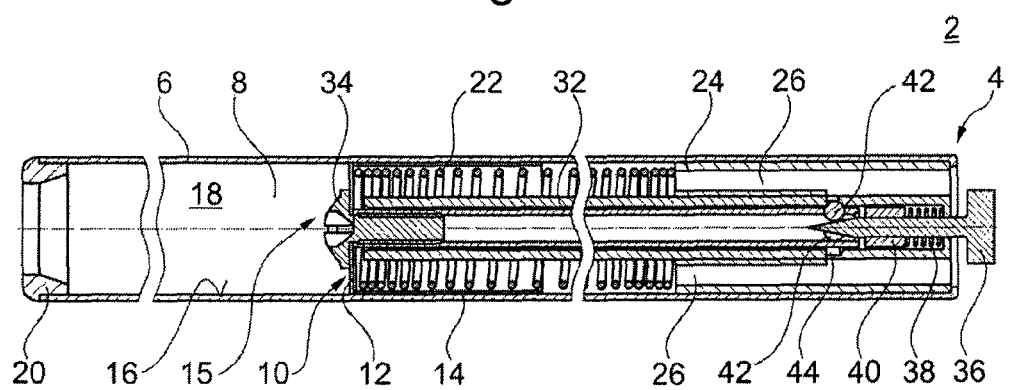
FIG. 2 shows a pressure accumulator having a locking device in a longitudinal section according to one alternative specific embodiment.

FIG. 2 shows a pressure accumulator 2 having a locking device 4 in a longitudinal section according to one alternative specific embodiment. Pressure accumulator 2 essentially corresponds to the pressure accumulator illustrated in FIG. 1.

In contrast thereto, guiding tube 28 has axially struck a ledge of supporting element 24 and is supported with the aid of a press fit in supporting element 24. Receiver 44 for balls 42 is formed by a circumferential recess in the inner jacket surface of supporting element 24 which forms a circumferential groove together with the front side of guiding tube 28 facing locking pin 36. In this way, receiver 44 does not have to be introduced into guiding tube 28 which is relatively thin-walled compared to supporting element 24 and may thus be manufactured more simply and cost-effectively.

Figure 3:
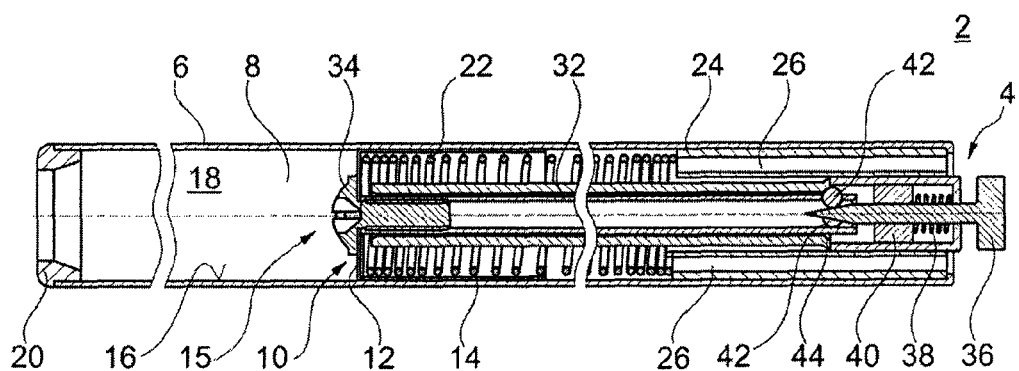
FIG. 3 shows a pressure accumulator having a locking device in a longitudinal section according to another alternative specific embodiment.

FIG. 3 shows a pressure accumulator 2 having a locking device 4 in a longitudinal section according to another alternative specific embodiment. Pressure accumulator 2 essentially corresponds to the pressure accumulator illustrated in FIG. 1.

In contrast thereto, locking pin 36 is situated within an assembly sleeve 46. Guiding tube 28 is supported here in supporting element 24 with the aid of a clearance fit. Assembly sleeve 46 is supported in supporting element 24 with the aid of a press fit, guiding sleeve [sic; tube] 28 having axially struck assembly sleeve 46. In this way, guiding tube 28 is axially secured, and in particular locking pin 36 and restoring element 38 may be preassembled in assembly sleeve 46.

The inner diameter of guiding tube 28 is widened at the end facing assembly sleeve 46 in such a way that the widening forms receiver 44 for balls 42. By widening guiding tube 28 to form receiver 44 for balls 42, it is not necessary to manufacture a recess, for example.

LIST OF REFERENCE NUMERALS 2 pressure accumulator
4 locking device
6 housing
8 housing cavity
10 piston
12 piston crown
14 piston skirt
15 pressure surface
16 wall
18 reservoir
20 sealing plug
22 energy store
24 supporting element
26 axial bore
28 guiding tube
30 retaining ring
32 locking tube
34 screw
36 locking pin
38 restoring element
40 bush
42 ball
44 receiver
46 assembly sleeve

What is claimed is:

1. A pressure accumulator for supporting the pressure supply of at least one consumer of an internal combustion engine, the pressure accumulator comprising:
   a housing having a housing cavity having a wall;
   a piston axially displaceable in the housing cavity between a first final position and a second final position and provided with a pressure surface which together with the wall of the housing cavity delimits at least partially a reservoir connectable to the consumer in a fluid-conveying manner;
   an energy store which cooperates with the piston, the piston being displaceable against the force of the energy store from the first final position into the second final position in that the reservoir is acted on by pressure using a pressure medium; and
   a lock for locking the piston in the second final position, the lock including a locking tube connected to the piston and supported within the housing in an axially shiftable manner, the locking tube being lockable at an end of the housing facing away from the reservoir with the aid of a locking pin.

2. The pressure accumulator as recited in claim 1 wherein the locking tube is axially displaceably supported within a guiding tube situated coaxially in the housing cavity, the locking tube having a radial bore in which a ball is radially movably accommodated, the locking pin being axially displaceably situated at an end of the housing facing away from the reservoir against the restoring force of a restoring element, and the ball being at least partially accommodated by a receiver in the second final position in such a way that the locking pin cooperates with the ball to lock the piston.

3. The pressure accumulator as recited in claim 1 wherein the locking tube has a plurality of radial bores distributed in the peripheral direction, in each radial bore a ball being radially movably accommodated in each case.

4. The pressure accumulator as recited in claim 1 further comprising a supporting element having a through borehole being introduced within the housing at the end facing away from the reservoir, the energy store being supported at the front side of the supporting element facing the reservoir.

5. The pressure accumulator as recited in claim 4 wherein at least one axial bore is introduced into the wall of the supporting element.

6. The pressure accumulator as recited in claim 5 wherein the bore is for pressure compensation and/or for the discharge of a pressure medium leakage.

7. The pressure accumulator as recited in claim 2 wherein the receiver is situated in the inner jacket surface of the guiding tube.

8. The pressure accumulator as recited in claim 7 wherein, to axially delimit the path of the guiding tube, the guiding tube has a groove having a retaining ring situated therein, the retaining ring resting axially against the supporting element.

9. The pressure accumulator as recited in claim 2 wherein the guiding tube axially contacts the supporting element, the receiver being situated in the inner jacket surface of the supporting element.

10. The pressure accumulator as recited in claim 2 wherein the receiver is designed as a circumferential ring groove.

11. The pressure accumulator as recited in claim 2 wherein the locking pin is situated within an assembly sleeve, the guiding tube having axially contacted the assembly sleeve and the inner diameter of the guiding tube being widened at the end facing the assembly sleeve in such a way that the widening forms the receiver for the ball.

12. The pressure accumulator as recited in claim 1 wherein the energy store includes a spring element.

\* \* \* \* \*